United States Patent
Whittle et al.

(10) Patent No.: US 6,702,886 B2
(45) Date of Patent: Mar. 9, 2004

(54) MOLD COATING

(75) Inventors: Neville C. Whittle, Pittsburgh, PA (US); Roger W. Kaufold, Pittsburgh, PA (US); Jamal Righi, Grand Rapids, MI (US); Joseph P. Harenski, Export, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/300,429

(22) Filed: Nov. 20, 2002

(65) Prior Publication Data

US 2003/0124395 A1 Jul. 3, 2003

Related U.S. Application Data

(60) Provisional application No. 60/332,109, filed on Nov. 20, 2001.

(51) Int. Cl.$^7$ ............................ C04B 35/66; B28B 7/36; B28B 7/38; B32B 15/04; B05D 1/36
(52) U.S. Cl. ................ 106/38.27; 106/38.9; 106/38.22; 428/702; 428/472; 427/133; 427/404
(58) Field of Search .............................. 106/38.27, 38.9, 106/38.22; 428/702, 472; 427/133, 404

(56) References Cited

U.S. PATENT DOCUMENTS

| | | | |
|---|---|---|---|
| 4,175,611 A | 11/1979 | Fletcher | 164/418 |
| 4,196,769 A | 4/1980 | Feagin | 164/26 |
| 4,740,246 A | 4/1988 | Feagin | 106/38.22 |
| 4,787,439 A | 11/1988 | Feagin | 164/518 |
| 4,877,705 A | 10/1989 | Polidor | 428/34.6 |
| 5,394,933 A | 3/1995 | Takayanagi | 164/369 |
| 5,464,797 A | 11/1995 | Yasrebi et al. | 501/103 |

*Primary Examiner*—Michael Marcheschi
(74) *Attorney, Agent, or Firm*—Christian E. Schuster; Gary P. Topolosky

(57) ABSTRACT

A coating for a mold surface of a casting mold includes a metallic bond coat bonded to the mold surface and having a continuous, uniform thickness of between about 0.002 to 0.005 inch on the mold surface. A topcoat of yttria stabilized zirconia is located on top of the metallic bond coat and has a continuous, uniform thickness of between about 0.005 to 0.030 inch. The topcoat has a porosity between 5–15%. The topcoat has a surface layer having a thickness of between about 0.001 to 0.002 inch and a porosity of less than 1%.

20 Claims, 1 Drawing Sheet

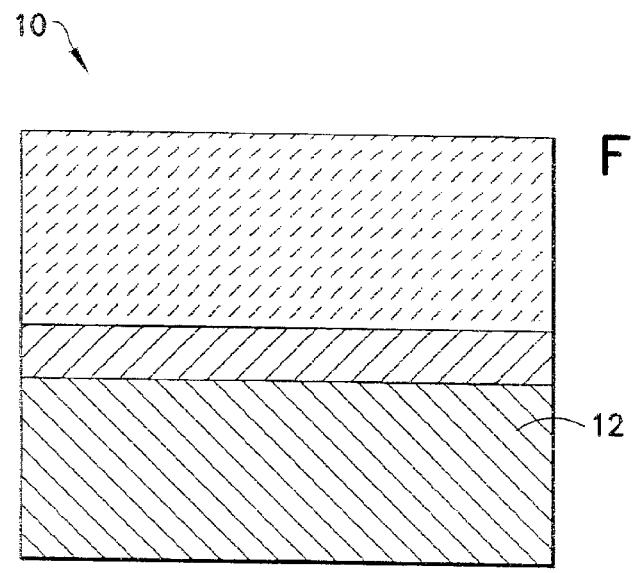
FIG.1
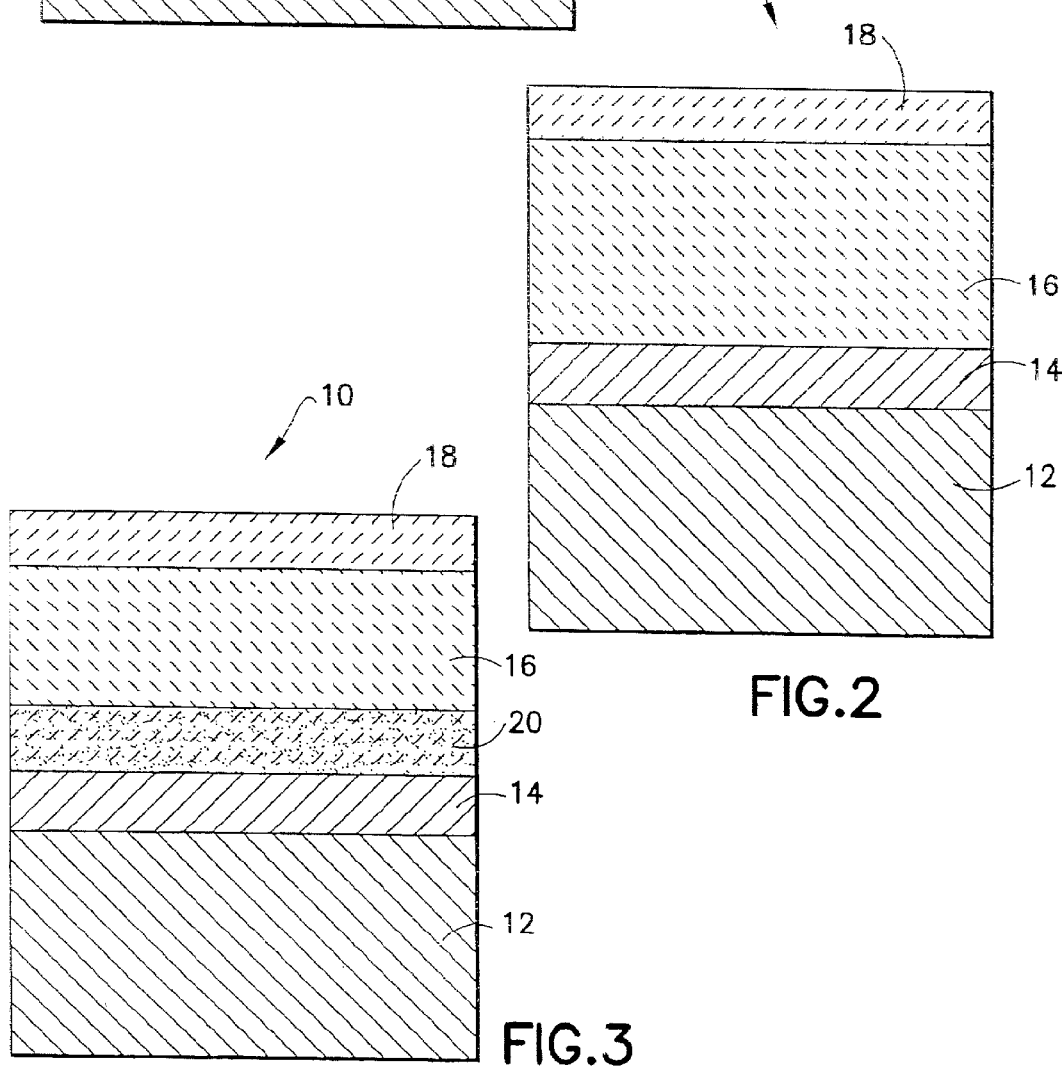
FIG.2
FIG.3

MOLD COATING

CROSS REFERENCE TO RELATED APPLICATION

This application claims the benefit of U.S. Provisional Application Ser. No. 60/332,109 filed Nov. 20, 2001, and entitled "Chemically Stable And Durable Coating For Permanent Molds", the disclosure of which is fully incorporated herein.

BACKGROUND OF THE INVENTION

1. Field of the Invention

The present invention relates to coatings for permanent molds used in the casting industry and, more particularly, plasma spray zirconia coatings for permanent molds that may be stabilized with yttria or ceria or an equivalent.

2. Description of the Prior Art

Mold coatings employed in the permanent mold casting industry today generally consist of an insulating coating layer combined with a release coating layer. These coatings are necessary to control the casting solidification rate, casting release, limit metal build-up on the mold surface, and to generally prolong mold life. Unfortunately, the durability of these coatings is quite poor, which necessitates their frequent repair and even total reapplication during a casting campaign. The frequent repair and touch-up of the coatings may affect casting performance and quality through inconsistent heat transfer with variable coating thicknesses and metal build-up on the mold surface. Further, the downtime associated with maintaining the coatings significantly affects productivity. When casting performance is unsatisfactory, the coatings/metal build-up may either be locally removed with an abrasive blast or grinding process or, in extreme cases, the whole cavity must be cleaned and recoated. Finally, since these coatings are normally applied by low technology painting or spraying processes, it is likely that the coatings will vary within a mold or from one application to the next.

In addition, coatings in use today do not perform adequately as they have low wear resistance against aluminum (drag/sliding wear against the casting on ejection), relatively low adhesion to the mold surface, low bond strength between powder particles forming the coatings (low cohesion), and low thermal fatigue resistance. These characteristics result in coatings that fail through a combination of wear mechanisms, principally sliding wear and fatigue.

Known prior art references in this area include U.S. Pat. Nos. 5,464,797 to Yasrebi et al.; 5,394,933 to Takayanagi; 4,877,705 to Polidor; 4,787,439 to Feagin; 4,740,246 to Feagin; 4,196,769 to Feagin; and 4,175,611 to Fletcher. The subject matter of the foregoing references is incorporated herein by reference. The Yasrebi et al. patent discloses yttria-zirconia slurries and mold facecoats for casting reactive metals in ceramic molds. The Takayanagi patent discloses a core for casting titanium and titanium alloys. The Takayanagi patent, in particular, discloses the use of a surface layer made of a material selected from among yttria, zirconia, hafnia, alumina, neodymium oxide, and samarium oxide, which is deposited as a coating layer on the surface of the core. The Polidor patent discloses a method of plasma spray coating ceramic bodies. In particular, the Polidor patent discloses the use of corrosion and erosion resistant materials suitable for such plasma sprayed coatings on alumina-graphite and zirconia-graphite bodies including one or more as mixtures of compounds of the following: zirconia; chromium oxide; alumina; silica; magnesia; zirconium silicate; and titanium oxide. The Feagin patents listed hereinabove are directed to casting of reactive metals in ceramic molds. The Feagin '769 patent, in particular, discloses a method of casting alloys having directionally solidified grains using a mold with coatings of zirconia and yttria. The Fletcher patent listed hereinabove discloses a graphite die that is plasma flame spray coated with a layer of magnesium zirconate.

In view of the foregoing, there is a need in the permanent mold casting industry to reduce production costs and increase productivity, casting quality, casting consistency, and alloy flexibility in permanent mold castings through the use of a chemically stable and durable coating(s). In addition, there is a need to inhibit or change the wear mechanisms present during casting campaigns utilizing permanent molds. Further, there is a need in the permanent mold casting industry to provide the ability to tailor the thermal properties of the coating(s) applied to the mold surface by changing the material used and the structure of the coating (i.e., number of layers, porosity, thicknesses, etc.).

SUMMARY OF THE INVENTION

The above needs are fulfilled with a coating for a mold surface of a casting mold in accordance with the present invention. The coating of the present invention is a chemically stable and durable mold coating having certain desired characteristics including: (1) thermal conductivity similar to known mold coatings; (2) thermal shock resistance; (3) thermal fatigue resistance; (4) wear resistance (i.e., casting drag); (5) molten aluminum dissolution resistance; and (6) reproducibility. The coating according to the present invention is a multi-layered coating for a mold surface of a casting mold, which generally comprises a metallic bond coat for bonding to the mold surface and a topcoat comprising yttria stabilized zirconia applied over the metallic bond coat.

The coating may further comprise an intermediate coat located between the metallic bond coat and the topcoat. The intermediate coat may comprise a graded mixture of yttria stabilized zirconia and NiCr. The topcoat may be applied to the mold surface by thermal plasma spraying. The topcoat is preferably about 0.005 to about 0.03 inch thick. The topcoat preferably has a porosity of about 5 to about 15%. The topcoat may further comprise magnesium zirconate The coating may further comprise a surface layer having the same composition as the topcoat, preferably with a porosity of less than about 1%. The surface layer may be about 0.001 to about 0.002 inch thick.

The metallic bond coat is preferably about 0.002 to about 0.005 inch thick. The metallic bond coat may comprise NiCr or NiCrAlY.

In another embodiment, the multi-layered coating for the mold surface may comprise a metallic bond coat for bonding to the mold surface, a topcoat, and an intermediate coat located between the metallic bond coat and the topcoat. The topcoat preferably comprises yttria stabilized zirconia applied over the metallic bond coat. The topcoat preferably has a porosity of about 5 to about 15%. A surface layer is applied over the topcoat. The surface layer preferably comprises the same composition as the topcoat and has a porosity of less than about 1%. The intermediate coat preferably comprises a graded mixture of the materials comprising the metallic bond coat and the topcoat.

The metallic bond coat preferably comprises NiCr or NiCrAlY. The topcoat is preferably applied to the mold surface by thermal plasma spraying. The topcoat may further comprise magnesium zirconate.

The present invention is further directed to a method of coating a mold surface of a casting mold, generally comprising the steps of: providing a casting mold having a mold surface, with the mold surface shaped to form a cast product; applying a metallic bond coat to the mold surface; and applying a topcoat over the metallic bond coat.

The method step of applying a topcoat may comprise thermal plasma spraying yttria stabilized zirconia over the metallic bond coat. The method may further comprise a step of plasma spraying an intermediate coat on top of the metallic bond coat prior to the step of plasma spraying the topcoat. The intermediate coat may comprise a graded mixture of the materials comprising the metallic bond coat and the topcoat. The metallic bond coat may comprise NiCr or NiCrAlY.

The topcoat preferably has a porosity of about 5 to about 15%. The method may further comprise a step of applying a surface layer over the topcoat. The surface layer preferably has the same composition as the topcoat and a porosity of less than about 1%.

Further details and advantages of the present invention will become apparent from the following detailed description when read in conjunction with the drawings, wherein like parts are designated with like reference numerals.

BRIEF DESCRIPTION OF THE DRAWINGS

FIG. 1 is a schematic cross sectional view of a preferred coating structure for the mold surface of a casting mold in accordance with a first embodiment of the present invention;

FIG. 2 is a second schematic cross sectional view of the coating structure of FIG. 1; and FIG. 3 is a schematic cross sectional view of a coating structure for the mold surface of a casting mold according to another embodiment of the present invention.

DETAILED DESCRIPTION OF THE PREFERRED EMBODIMENTS

Referring to FIG. 1, a preferred coating structure 10 for a substrate 12 in accordance with the present invention is shown. For the coating structure 10 shown in FIG. 1, it is known that the thermal characteristics of the coating structure 10 are a function of the number of layers, the thickness, and defect content of the coating structure 10. The coating structure 10 is intended for use in permanent mold casting operations. Preferably, the coating structure 10 is suitable for use with molten aluminum casting operations. The coating structure 10 may be a single or multi-layer coating structure. Two materials are generally preferred for the coating structure, including (1) yttria stabilized zirconia and (2) magnesium zirconate. Suitable thicknesses for the coating structure 10 are in the range of about 0.005 to 0.050 inch.

As will be apparent by those skilled in the art, during a casting cycle, the mold surface of a casting mold experiences a large change in temperature from near the molten alloy (i.e., aluminum) temperature of about 1300° F. to a low of about 500–600° F. The coating structure 10 used on the substrate 12 must therefore be able to withstand such a thermal cycle and its associated thermal stress.

Referring to FIG. 2, the coating structure 10 of the present invention includes a bond coat 14 applied to the substrate 12 and a topcoat 16 applied on top of the bond coat 14. The topcoat 16 is made of yttria stabilized zirconia having a thickness in the range of about 0.005–0.030 inch. The topcoat 16 is bonded to the substrate 12 by the bond coat 14, which is preferably a metallic bond coat made of NiCr or NiCrAlY. The bond coat 14 has a continuous, uniform thickness of about 0.002–0.005 inch on the substrate 12. The overall thickness of the bond coat 14 and the topcoat 16 forming the coating structure 10 is preferably in the range of about 0.005 to 0.030 inch on the substrate 12. However, thicknesses up to 0.50 inch for the coating structure 10 is also in accordance with the present invention.

A low cycle fatigue model and casting simulation test was performed using a yttria stabilized zirconia topcoat 16 as provided by the present invention. The yttria stabilized zirconia topcoat 16 was deposited on the substrate 12 by plasma thermal spray. An alternative method of depositing the topcoat 16 on the substrate 12 is physical vapor depositing (PVD) the yttria stabilized zirconia topcoat 16 on the substrate 12. From the low cycle fatigue model and casting stimulation test, it was determined that the coating structure 10 with the yttria stabilized zirconia topcoat 16 was able to withstand the thermal stresses occurring during casting of molten aluminum in a casting mold. After approximately 10,000 cycles, the topcoat 16 was in good condition exhibiting no cracks on a microscopic examination after magnifications up to 200×. The overall thickness of the tested coating structure 10 was between about 0.005–0.030 inch on the substrate 12. Further, the porosity of the topcoat 16 utilized in the low cycle fatigue model and casting simulation test was about 5–15%.

Based on the test conducted, the presently preferred coating structure 10 in accordance with the present invention has the following specification:

| Coating Layer | Specification |
|---|---|
| Topcoat | Material: yttria stabilized zirconia<br>Thickness: 0.005–0.030 inch<br>Porosity: 5–15% |
| Bond coat | Material: NiCr or NiCrAlY<br>Thickness: 0.002–0.005 inch |

In the test conducted, the coating structure 10 was polished to 50–150 uin Ra. As stated, the preferred deposition method is thermal plasma spray, but physical vapor depositing (PVD) of the topcoat 16 is also in accordance with the present invention.

The topcoat 16 includes a surface layer 18 having a thickness of about 0.001 to 0.002 inch. The surface layer 18 is used to seal the top most surface of the topcoat 16, and has a porosity of less than 1%. For example, the surface layer may be a fine blend powder of yttria stabilized zirconia.

Referring to FIG. 3, another embodiment of the coating structure 10 of the present invention is shown. The coating structure 10 shown in FIG. 3 is substantially similar to the coating structure 10 of FIG. 2, but further includes an intermediate coat 20 disposed between the bond coat 14 and the topcoat 16. The bond coat 14 and the topcoat 16 in the coating structure 10 of FIG. 3 have similar thicknesses, porosity, and material compositions as the bond coat 14 and topcoat 16 of the coating structure 10 of FIG. 2. The intermediate coat 20 located between the bond coat 14 and the topcoat 16 has a thickness of about 0.002–0.004 inch. The intermediate coat 20 is a graded mixture of the materials comprising the bond coat 14 and the topcoat 16.

The present invention is further directed to a method of coating a mold surface of a casting mold. The method generally comprises the steps of: (1) providing a casting mold having a mold surface, with the mold surface shaped to form a cast product; (2) applying the metallic bond coat 14 to the mold surface; and (3) applying the topcoat 16 over the metallic bond coat 14. The method step of applying the topcoat 16 may comprise thermal plasma spraying yttria stabilized zirconia over the metallic bond coat 14. The method may further comprise a step of plasma spraying the intermediate coat 20 on top of the metallic bond 14 coat prior to the step of plasma spraying the topcoat 16. The intermediate coat 20 preferably comprises a graded mixture of the materials of the metallic bond coat 14 and the topcoat 16. The metallic bond coat 14 is preferably comprised of NiCr or NiCrAlY.

The topcoat 16 preferably has a porosity of about 5 to about 15%. The method may further comprise a step of applying a surface layer 18 over the topcoat 16. The surface layer 16 preferably has the same composition as the topcoat 16 and a porosity of less than about 1%.

The present invention provides a thermal plasma spray coating structure for permanent molds that results in improved wear resistance, improved thermal fatigue resistance, and improved thermal shock characteristics for permanent molds. In addition, the coating structure of the present invention enables greater reproducibility because of the plasma thermal spray deposition process. Further, the coating structure, when applied to the mold surface of a casting mold, results in consistent heat transfer leading to consistent solidification rates in the casting mold, decreased die coating maintenance, and improved casting quality and productivity. Furthermore, the coating structure of the present invention provides the ability to tailor coating thermal conductivity properties through coating thickness and porosity content.

While presently preferred embodiments of the present invention were described hereinabove, the scope of the present invention is defined by the appended claims and equivalents thereto.

What is claimed is:

1. A multi-layered coating for a mold surface of a casting mold, comprising:
   a metallic bond coat for bonding to a mold surface; and
   a topcoat comprising yttria stabilized zirconia applied over said metallic bond coat.

2. The coating of claim 1 further comprising an intermediate coat located between said metallic bond coat and said top coat, said intermediate coat comprising a graded mixture of yttria stabilized zirconia and NiCr.

3. The coating of claim 1 wherein said topcoat is applied to a mold surface via thermal plasma spraying.

4. The coating of claim 3 wherein said topcoat is about 0.005 to about 0.03 inch thick.

5. The coating of claim 4 wherein said topcoat has a porosity of about 5 to about 15%.

6. The coating of claim 4 further comprising a surface layer of the same composition as said topcoat and having a porosity of less than about 1%.

7. The coating of claim 6 wherein said surface layer is about 0.001 to about 0.002 inch thick.

8. The coating of claim 1, wherein said topcoat further comprises magnesium zirconate.

9. The coating of claim 1 wherein said metallic bond coat is about 0.002 to about 0.005 inch thick.

10. The coating of claim 1, wherein the metallic bond coat comprises NiCr.

11. The coating of claim 1, wherein the metallic bond coat comprises NiCrAlY.

12. A multi-layered coating for a mold surface of a casting mold, comprising:
    a metallic bond coat for bonding to a molding surface of a mold;
    a topcoat comprising yttria stabilized zirconia applied over the metallic bond coat, with the topcoat having a porosity of about 5 to about 15% and a surface layer applied over the topcoat, said surface layer comprising the same composition as said topcoat and having a porosity of less than about 1%; and
    an intermediate coat located between the metallic bond coat and the topcoat, with the intermediate coat comprising a graded mixture of the materials comprising the metallic bond coat and the topcoat.

13. The coating of claim 12 wherein said metallic bond coat comprises NiCr or NiCrAlY.

14. The coating of claim 12 wherein said topcoat is applied to a mold surface via thermal plasma spraying.

15. The coating of claim 12 wherein said topcoat further comprises magnesium zirconate.

16. A method of coating a mold surface of a casting mold comprising:
    providing a casting mold having a mold surface, with the mold surface shaped to form a cast product;
    applying a metallic bond coat to the mold surface; and
    applying a topcoat over the metallic bond coat, the topcoat comprising yttria stabilized zirconia.

17. The method of claim 16 where said step of applying a topcoat comprises thermal plasma spraying yttria stabilized zirconia over the metallic bond coat.

18. The method of claim 17, further comprising a step of plasma spraying an intermediate coat on top of the metallic bond coat prior to the step of plasma spraying the topcoat, the intermediate coat comprising a graded mixture of the materials comprising the metallic bond coat and the topcoat.

19. The method of claim 16 wherein the metallic bond coat comprises NiCr or NiCrAlY.

20. The method of claim 16 wherein the topcoat has a porosity of about 5 to about 15%, and further comprising a step of applying a surface layer over the topcoat, the surface layer having the same composition as said topcoat and having a porosity of less than about 1%.

* * * * *